March 3, 1931.     E. HUBER     1,794,459
ELECTRIC MOTOR
Filed June 3, 1929

INVENTOR
Ernst Huber
BY
John D Morgan
ATTORNEY

Patented Mar. 3, 1931

1,794,459

UNITED STATES PATENT OFFICE

ERNST HUBER, OF ZUG, SWITZERLAND, ASSIGNOR TO LANDIS & GYR, A-G., A JOINT-STOCK COMPANY OF SWITZERLAND

ELECTRIC MOTOR

Application filed June 3, 1929, Serial No. 368,045, and in Switzerland June 16, 1928.

The present invention relates to new and useful improvements in self-starting, single phase motors, and more particularly to extremely small motors of this general type.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, construction, arrangements, combinations and improvements herein shown and described.

The accompanying drawings, referred to herein and constituting a part hereof, illustrate one embodiment of the invention, and together with the description, serve to explain the principles of the invention.

Of the drawings:—

Figure 1:
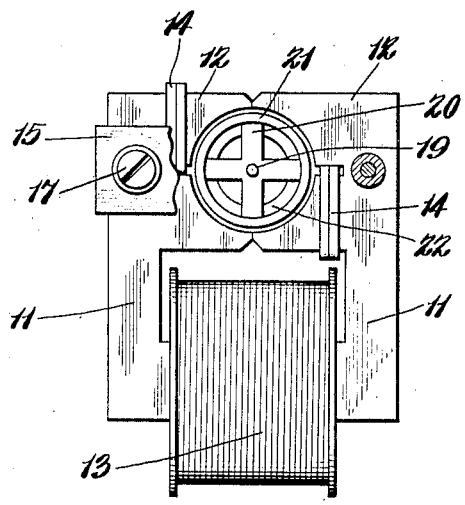
Figure 2:
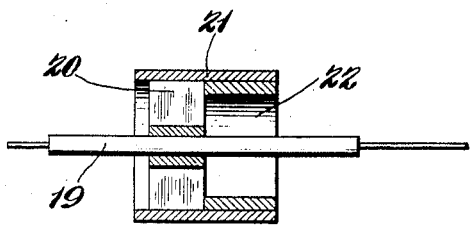

Fig. 1 is a side elevation of a motor in accordance with the present invention, the side frames being broken away; and Fig. 2 is a central longitudinal section through the rotor of the motor shown in Fig. 1.

The present invention is directed to a single phase, self-starting motor which can be conveniently and economically built with very small dimensions, and provides a simple, rugged motor having a relatively low speed and relatively high starting torque, which is dependable and will run for extremely long periods of time without attention. The invention further provides a self-starting, single-phase, synchronous motor which has practically no slip and is particularly adapted for use in multiple-tariff meters, electric clocks and switching apparatus, although its broad field of usefulness is not so limited.

Heretofore, small single phase synchronous motors have been generally unsatisfactory by reason of their high speed (usually 3000–3600 R. P. M.) which necessarily gave rise to serious bearing trouble in case the motors were used for long periods and received no attention, and such motors as have been available have been delicate, costly, manufactured with difficulty and have developed a very low torque. Furthermore, it has usually been necessary to make the rotors out of hardened steel.

In the present preferred embodiment of the invention, the motor comprises a plural-poled stator having portions of each of its poles shaded to provide a rotating field, and between these poles is rotatably mounted a rotor comprising a multi-poled, synchronous armature, preferably formed of a single piece of magnetic material, and supporting an asynchronous armature comprising a cylindrical shell of highly conductive metal, within which is snugly fitted a ring of magnetic material.

It will be understood that the foregoing general description and the following detailed description as well, are exemplary and explanatory of the invention, but are not restrictive thereof.

Referring now in detail to the accompanying drawings, showing the present preferred embodiment, there is provided a stator in which a magnetic field is produced by means of a magnet coil through which flows the energizing alternating current. As embodied, the stator comprises a laminated core 11 having a pair of pole pieces 12 which nearly meet and leave a gap for the rotor between them. Surrounding the mid-portion of the core 11, there is provided a coil 13 comprising the necessary turns of wire and through which the energizing alternating current flows while the motor is in operation. For producing a rotating, or moving, field, the ends of the stator pole pieces 12 are preferably inwardly slotted to provide bifurcated pole pieces allowing a portion of each pole to be shaded by means of short-circuiting rings 14, preferably formed of copper.

For securing the laminations of the core 11 together, and for mounting the bearing frames 15 of the motor on the core 11, columns are provided at each side of the stator and secured to the core 11 by screws 17 passing through these columns and through the side frames 15, thereby clamping the side frames to the core, and securely holding the laminations of the core together.

The rotor of the motor which is rotatably mounted between the stator poles 12, by means of shaft 19, journaled in side frames 15, preferably comprises a synchronous armature and an asynchronous armature mounted side by side. The asynchronous armature provides a high starting torque which tends to raise the speed of the armature above synchronous speed, and the synchronous armature controls the speed of the rotor and adds its torque to that of the asynchronous armature while the rotor rotates faster than the stalling speed of the synchronous armature.

As embodied, the synchronous armature, or rotor, preferably comprises a four-poled member 20 formed of iron or steel, which need not be hardened, and which forms definite magnetic poles. While shown as having four poles, it is obvious that the synchronous armature 20 can have more poles if it is desired to further reduce the speed of the rotor.

The asynchronous armature preferably comprises a cylindrical shell 21 of highly-conductive material, such as copper, extending over the entire width of stator, and in the embodied form, is supported on shaft 19 and at one side of the synchronous armature 20, by means of the pole pieces of the synchronous armature 20, although it may be separately mounted on shaft 19, if desired. For increasing the inductive effect of the alternating magnetic field upon the asynchronous shell 21, a ring 22 of iron or steel is snugly fitted within and supported by the shell 21, at one side of synchronous armature 20. If desired, the ring 22 may be formed of laminated iron.

As the alternating current is applied to magnet coil 13, the rotation of the rotor is initiated by means of the asynchronous armature 21, and by means of the moving, or rotating, stator field, which tend to bring the rotor speed above the synchronous speed, but as soon as the rotor speed equals the synchronous speed, the torque of the synchronous armature is added to that of the asynchronous armature. By reason of the definite poles of the synchronous armature 20, the speed of rotation is controlled and held constant, unless an excessive load is applied, when the asynchronous armature would develop increased torque and pull the speed to normal. By reason of the fact that both armatures are always operative to transmit their torque to the rotor shaft, the asynchronous armature gives a high starting torque, to compensate for the low torque of the synchronous armature.

The definite poles of the synchronous armature substantially prevent slipping of the rotor.

The invention in its broader aspects is not limited to the specific mechanisms shown and described but departures may be made therefrom within the scope of the accompanying claims without departing from the principles of the invention and without sacrificing its chief advantages.

What I claim is:—

1. A self-starting synchronous motor including in combination a stator having a pair of poles and a rotor rotatably mounted between the poles and comprising a four-poled synchronous rotor, a copper ring overlying and supported by the synchronous rotor, and an iron ring snugly fitted within the copper ring and at one side of the synchronous rotor for bringing the synchronous rotor up to speed.

2. A self-starting, single phase motor including in combination a stator having a plurality of bifurcated, shaded poles, a plural poled synchronous rotor, rotatably mounted between the stator poles, a magnetic body at one side of the synchronous rotor and a ring of conducting material supported by the synchronous rotor and surrounding and supporting the magnetic body.

3. A self-starting, single phase induction motor including in combination a stator having a pair of shaded poles, a rotor, rotatably mounted between the stator poles and comprising a synchronous multi-poled armature, and an asynchronous induction armature having a copper ring, mounted on the poles of the synchronous armature and a mass of magnetic material supported by and within the copper ring.

In testimony whereof, I have signed my name to this specification.

ERNST HUBER.